United States Patent
Shimamura (10) Patent No.: US 7,184,807 B2
(45) Date of Patent: Feb. 27, 2007

(54) CELLULAR PHONE AND ATTACHMENT THEREOF

(75) Inventor: Masaki Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 10/702,619

(22) Filed: Nov. 7, 2003

(65) Prior Publication Data

US 2004/0097277 A1 May 20, 2004

(30) Foreign Application Priority Data

Nov. 15, 2002 (JP) .............................. 2002-332519

(51) Int. Cl.
*H04B 1/38* (2006.01)

(52) U.S. Cl. .............................. 455/575.6; 455/556.1; 455/556.2; 455/557; 455/566

(58) Field of Classification Search ................ 455/572, 455/574, 575.1, 575.3, 575.6, 575.8, 90.3, 455/556.1, 556.2, 557, 566

See application file for complete search history.

(56) References Cited

U.S. PATENT DOCUMENTS

| | | | | |
|---|---|---|---|---|
| 5,797,102 | A * | 8/1998 | Hallikainen et al. | 455/557 |
| 5,859,522 | A * | 1/1999 | Theobald | 320/106 |
| 6,118,986 | A * | 9/2000 | Harris et al. | 455/575.3 |
| 6,389,268 | B1 * | 5/2002 | Snyder | 455/90.1 |
| 6,819,942 | B2 * | 11/2004 | Aotake et al. | 455/556.1 |
| 2002/0022499 | A1 * | 2/2002 | Newman et al. | 455/556 |
| 2002/0030103 | A1 | 3/2002 | Wycherley et al. | |
| 2002/0042291 | A1 * | 4/2002 | Lehteenmaki et al. | 455/566 |
| 2002/0137542 | A1 * | 9/2002 | Masutani et al. | 455/556 |
| 2002/0142810 | A1 | 10/2002 | Kawasaki et al. | |
| 2002/0197965 | A1 * | 12/2002 | Peng | 455/90 |
| 2003/0007169 | A1 * | 1/2003 | Tanaka et al. | 358/1.15 |
| 2005/0026643 | A1 * | 2/2005 | White et al. | 455/550.1 |

FOREIGN PATENT DOCUMENTS

| | | |
|---|---|---|
| CN | 1398132 A | 2/2003 |
| DE | 291 11 112 | 9/2001 |
| DE | 100 18 375 A1 | 10/2001 |
| EP | 1 091 540 A2 | 4/2001 |
| JP | 2002-125022 A | 4/2002 |
| WO | WO 01/75580 A2 | 10/2001 |
| WO | WO 03/075548 A1 | 9/2003 |

* cited by examiner

*Primary Examiner*—Matthew D. Anderson
*Assistant Examiner*—Tuan Pham
(74) *Attorney, Agent, or Firm*—Foley & Lardner LLP (57) ABSTRACT

A cellular phone can attach a detachable attachment thereto. The attachment includes a signal output unit which outputs a specific signal corresponding thereto, and an output terminal which outputs the signal to the cellular phone. The cellular phone includes a signal detection unit which detects the signal intrinsic to the attachment, and a control unit which controls a change for setting conditions of the cellular phone based on the signal. The attachment can include a predetermined function unit. The control unit can control the function unit in response to the signal.

29 Claims, 13 Drawing Sheets

| ATTACHMENT | SETTING CONDITION | | | | ADDITIONAL FUNCTION |
| --- | --- | --- | --- | --- | --- |
| | DISPLAY | SOUND | MEMORY ACCESS | COMMUNICATION LIMITATION | |
| a | • BACK DISPLAY AREA FOR USE a<br>• SCREEN DISPLAY CONTENT/ STANDBY IMAGE/ ICON/ FONT SETTING a | • RINGTONE SETTING a<br>• TEXT READER INVALID<br>• KEY OPERATION SOUND SETTING a | DIRECTORY/ HISTORY/ BOOKMARK/.../ SETTING a (FOR PERSONAL USE ON WEEKDAYS) | NO LIMITATIONS ON CALLING/ WEB ACCESS | CAMERA |
| b | • BACK DISPLAY AREA FOR USE b<br>• SCREEN DISPLAY CONTENT/ STANDBY IMAGE/ ICON/ FONT SETTING b | • RINGTONE SETTING b<br>• TEXT READER VALID<br>• KEY OPERATION SOUND SETTING b | DIRECTORY/ HISTORY/ BOOKMARK/.../ SETTING (FOR PERSONAL USE ON WEEKEND) | NO LIMITATIONS ON CALLING/ WEB ACCESS | SPEAKER |
| c | • BACK DISPLAY AREA FOR USE c<br>• SCREEN DISPLAY CONTENT/ STANDBY IMAGE/ ICON/ FONT SETTING c | • RINGTONE SETTING c<br>• TEXT READER INVALID<br>• KEY OPERATION SOUND SETTING c | DIRECTORY/ HISTORY/ BOOKMARK/.../ SETTING (FOR BUSINESS USE) | LIMITATIONS ON CALLING/ WEB ACCESS | NONE |

| ATTACHMENT | DISPLAY | SOUND | MEMORY ACCESS | COMMUNICATION LIMITATION |
|---|---|---|---|---|
| d | •SCREEN DISPLAY CONTENT/ STANDBY IMAGE/ ICON/ FONT SETTING d | •RINGTONE SETTING d •TEXT READER INVALID •KEY OPERATION SOUND SETTING d | DIRECTORY/ HISTORY/ BOOKMARK/... / SETTING d | NO LIMITATIONS ON CALLING/ WEB ACCESS |
| e | •SCREEN DISPLAY CONTENT/ STANDBY IMAGE/ ICON/ FONT SETTING e | •RINGTONE SETTING e •TEXT READER VALID •KEY OPERATION SOUND SETTING e | DIRECTORY/ HISTORY/ BOOKMARK/... / SETTING e | NO LIMITATIONS ON CALLING/ WEB ACCESS |
| f | •SCREEN DISPLAY CONTENT/ STANDBY IMAGE/ ICON/ FONT SETTING f | •RINGTONE SETTING f •TEXT READER INVALID •KEY OPERATION SOUND SETTING f | DIRECTORY/ HISTORY/ BOOKMARK/... / SETTING f | LIMITATIONS ON CALLING/ WEB ACCESS |

FIG. 14

CELLULAR PHONE AND ATTACHMENT THEREOF

BACKGROUND OF THE INVENTION

1. Field of the Invention

The present invention relates to a cellular phone, and particularly, to a cellular phone capable of attaching an attachment thereto.

2. Description of the Related Art

In recent years, varieties of colors and patterns are formed on backs (exterior surface portions when folding-type cellular phones are folded) of the folding-type cellular phones. Japanese Patent Laid-Open No. 2002-125022 discloses a cellular phone in which a glazed panel of a back is freely changeable to suit user's preference. However, a user cannot freely add functions to a purchased cellular phone. Moreover, in order to change setting conditions for the cellular phone in response to a usage situation, entries are required for many setting items.

SUMMARY OF THE INVENTION

A cellular phone of one aspect of the present invention is capable of attaching an attachment thereto, and includes a signal detection unit that detects a signal intrinsic to the attachment, and a control unit that controls at least one of a change of setting conditions and an addition of functions in the cellular phone based on the signal. In one embodiment of the cellular phone, it is possible to identify a type of the attachment attached thereto based on the specific signal. The cellular phone of the embodiment can include a terminal which transmits/receives the signal to/from the attached attachment, and a power supply terminal which supplies electric power to the attachment.

An attachment of the present invention is attached to the cellular phone, and includes a signal output unit which outputs a specific signal corresponding to a type of the attachment, and an output terminal which outputs the signal to the cellular phone. An attachment of the embodiment of the present invention can include a function unit which performs a predetermined function.

Another aspect of a cellular phone of the present invention is a cellular phone to which a detachable attachment is attached.

This attachment includes a signal output unit which outputs a specific signal corresponding to a type thereof, and an output terminal which outputs the signal to the cellular phone. The cellular phone includes a signal detection unit which detects the signal intrinsic to the attachment, and a control unit which controls a change of setting conditions for the cellular phone based on the signal. The attachment can include a function unit which performs a predetermined function, and the control unit can control at least one of a change of setting conditions and an addition of functions in the cellular phone.

Still another aspect of a cellular phone of the present invention is a cellular phone to which a detachable attachment is attached. The attachment includes a signal output unit which outputs a specific signal corresponding to a type thereof, and an output terminal which outputs the signal to the cellular phone. Moreover, the cellular phone includes a signal detection unit which detects a signal intrinsic to the attachment, and a control unit which controls a change of setting conditions based on the signal.

The cellular phone can easily add new functions thereto and can easily change many setting items by attaching the attachment thereto.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1A:
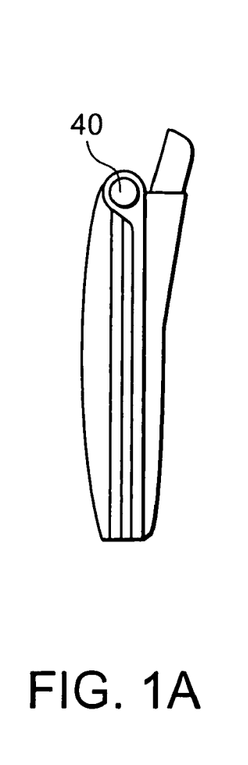
FIGS. 1A, 1B, 1C and 1D are side and back views in a closed state of a folding-type cellular phone and side and front views in an opened state thereof, respectively.
Figure 1B:
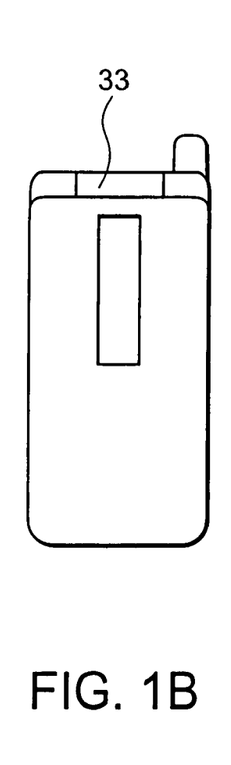
Figure 1C:
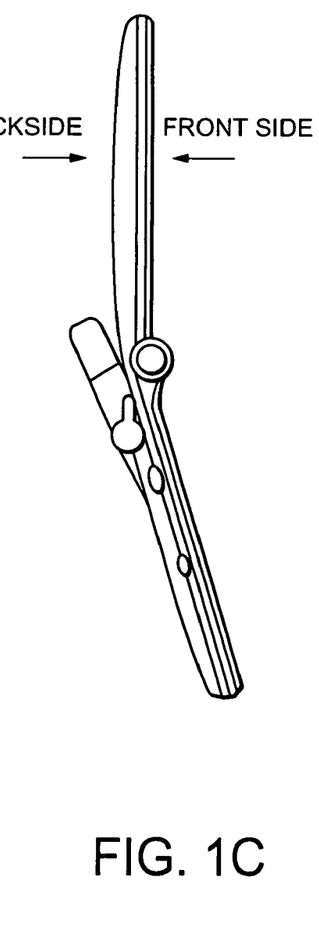
Figure 1D:
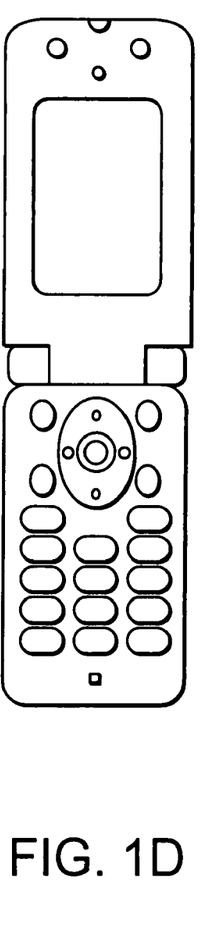

FIGS. 1A, 1B, 1C and 1D show a folding-type cellular phone, in which two casings are coupled to each other by a hinge 40, as an embodiment to which the present invention is applied. FIG. 1B is a back view of the cellular phone which is folded. The cellular phone includes a liquid crystal display unit 33 on a back thereof. As shown in FIGS. 1C and 1D, surfaces on which the large liquid crystal display unit and an operation unit are arranged, the surfaces appearing when the cellular phone is opened, area front surface of the cellular phone. It is possible to apply the present invention not only to the folding-type cellular phone but also to a straight-type one.

Figure 2:
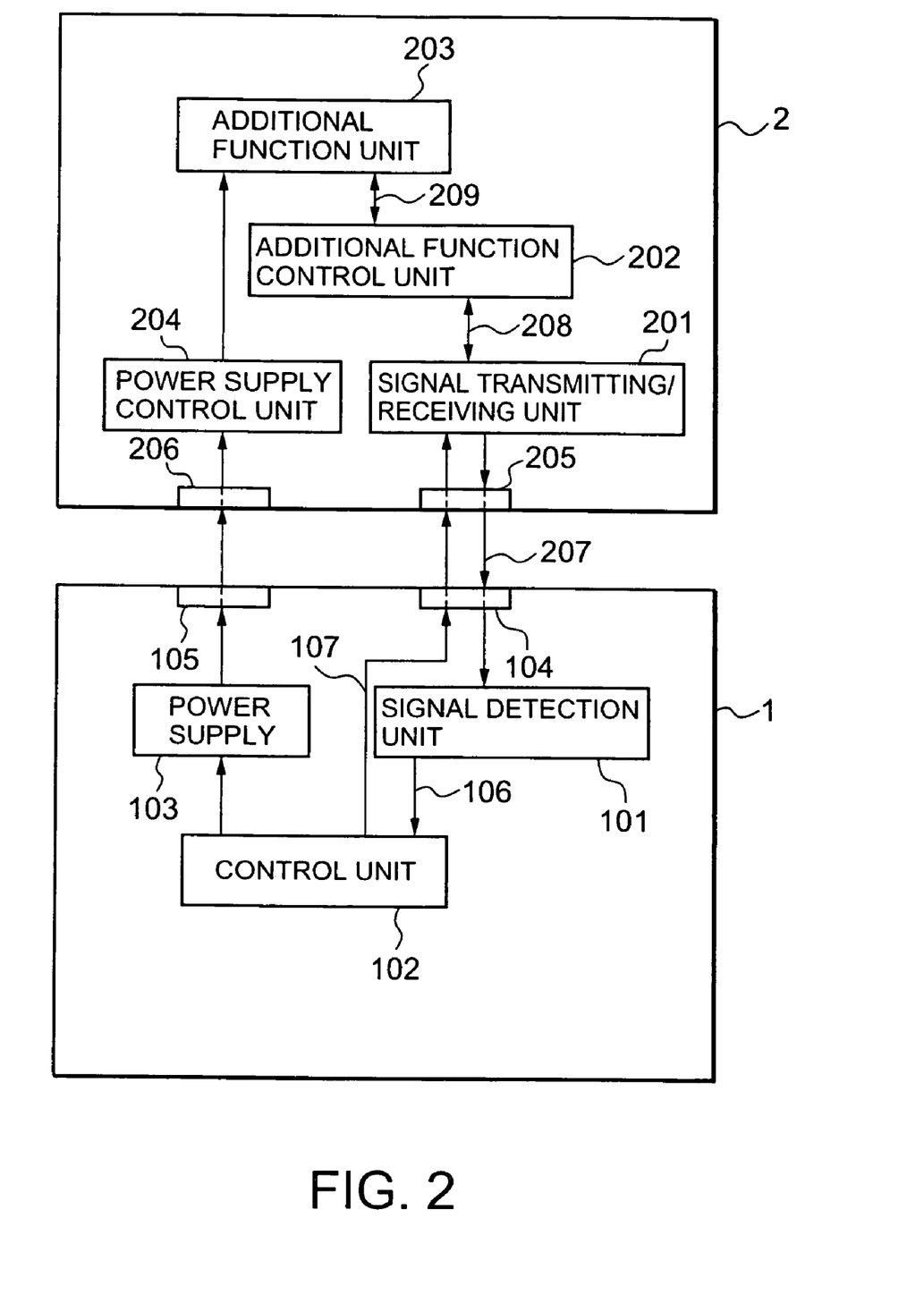
FIG. 2 is a block diagram of a cellular phone and an attachment of an embodiment.

FIG. 2 shows a block diagram of an embodiment of a cellular phone to which an attachment 2 is attached. A cellular phone 1 includes a signal detection unit 101, a control unit 102, a power supply 103, a signal terminal 104, and a power supply terminal 105. The signal detection unit 101 receives a signal 207 intrinsic to the attachment 2 through the signal terminal 104, detects that the attachment 2 has been attached to the cellular phone 1, identifies a type of the attachment 2, and outputs an identification signal 106 to the control unit 102. The control unit 102 receives the identification signal 106. When the identification signal 106 requires a new setting condition, the control unit 102 changes a setting condition of the cellular phone 1 to a predetermined setting condition corresponding to the identification signal 106. Moreover, the control unit 102 verifies, by means of the identification signal 106, whether the additional function unit 203 is present in the attachment 2, and identifies a type thereof when the function unit 203 is verified to be present. In this case, in order to add the function unit 203 included in the attachment 2 to the cellular phone 1, the control unit 102 transmits a control signal 107 to the attachment 2. The control unit 102 controls the power supply 103. When the cellular phone 1 attaches the attachment 2 thereto, the signal terminal 104 and power supply terminal 105 of the cellular phone 1 are connected to a signal terminal 205 and power supply terminal 206 of the attachment 2, respectively. The attachment 2 includes the additional function unit 203, an additional function control unit 202, a signal transmitting/receiving unit 201, a power supply control unit 204, the signal terminal 205, and the power supply terminal 206. The signal transmitting/receiving unit 201 transmits the specific signal 207 to the cellular phone 1, receives the control signal 107 from the control unit 102, and transmits a control signal 208 to the additional function control unit 202. The additional function control unit 202 receives the control signal 208, and transmits an additional function unit control signal 209 to the additional function unit 203, thus controlling the additional function unit 203. The additional function unit 203 is, for example, at least one of a camera, a speaker, a liquid crystal display unit, and a touch panel. The power supply control unit 204 receives a supply of electric power through the power supply terminal 206, and supplies the power to the additional function unit 203 and others. In place of the additional function control unit 202 and the power supply control unit 204, the control unit 102 of the cellular phone 1 can execute respective controls thereof.

Figure 3A:
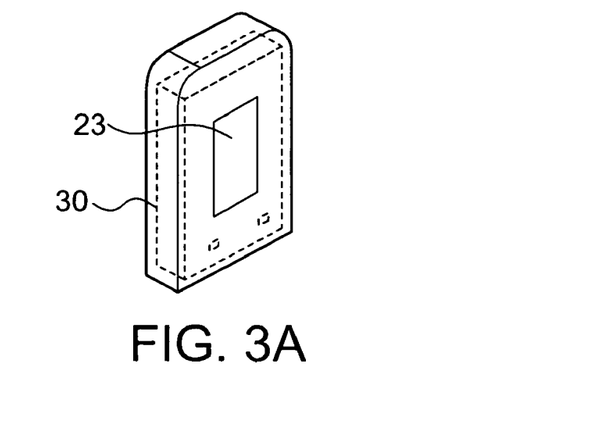
FIGS. 3A, 3B and 3C are a perspective view of the embodiment of the attachment, a perspective view showing a method for attaching the attachment to the cellular phone, and a perspective view of the embodiment of the cellular phone to which the attachment is attached, respectively.
Figure 3B:
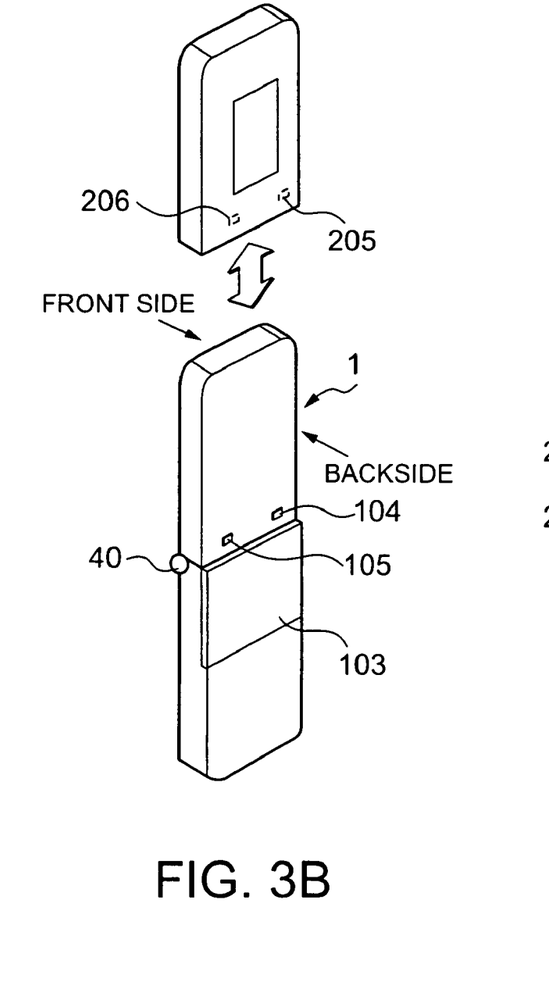
Figure 3C:
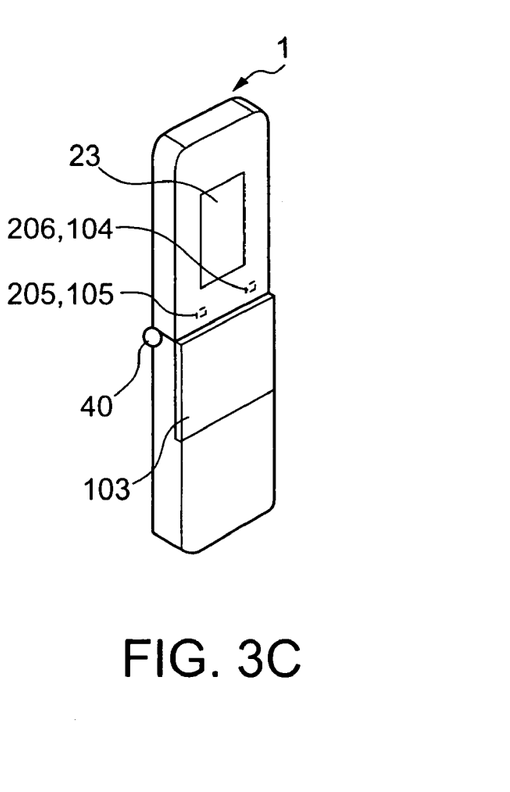

Referring to FIG. 3A, the attachment 2 in this embodiment includes a liquid crystal display unit 23, and in an inside thereof, includes a space portion 30 into which the cellular phone 1 is engaged. FIG. 3B shows a method for attaching the attachment 2 to the folding-type cellular phone 1. The space portion 30 in the attachment 2 is engaged onto a casing of the cellular phone 1, which includes a display unit, along an arrow direction in FIG. 3B. In this case, the terminals 104 and 105 of the cellular phone 1 are connected to the terminals 205 and 206 of the attachment 2, respectively. A major portion of one surface of the attachment 2 is cut away, and accordingly, the display unit of the cellular phone 1 is not covered with the attachment 2. A groove portion or a protruding portion, which is formed on the attachment 2, is engaged to a protruding portion or a groove portion, which is formed on the casing of the cellular phone 1, thus making it possible to attach the attachment 2 to the cellular phone 1 smoothly. FIG. 3C is a perspective view of the folding-type cellular phone 1 to which the attachment 2 is attached.

Figure 4:
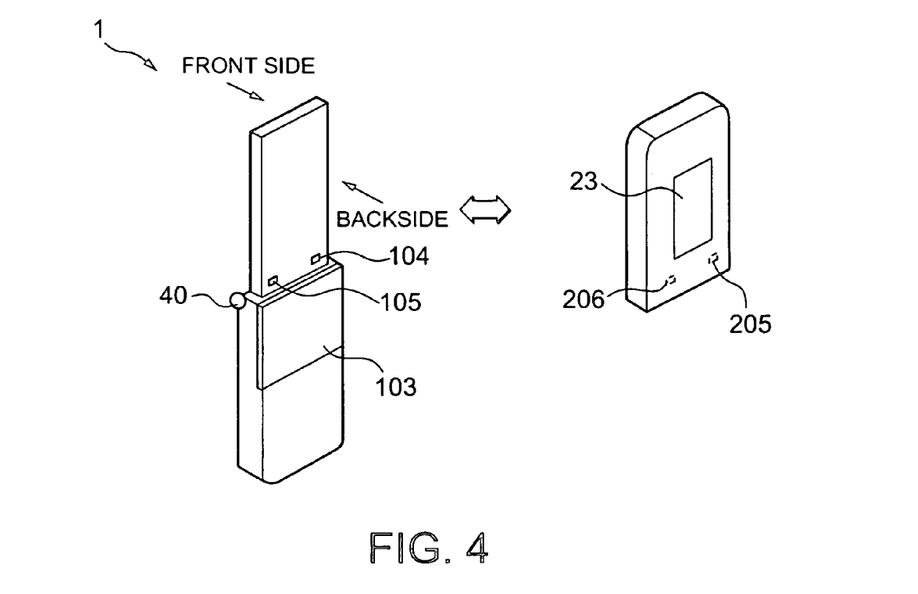
FIG. 4 is perspective views showing another example of the method for attaching the attachment to the cellular phone.
Figure 5A:
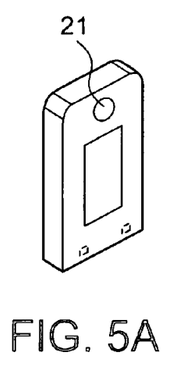
FIGS. 5A, 5B, 5C, 5D and 5E are perspective views showing embodiments of the attachment.
Figure 5B:
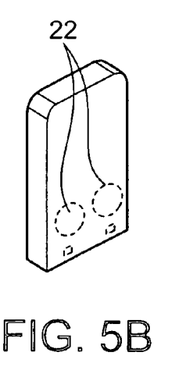
Figure 5C:
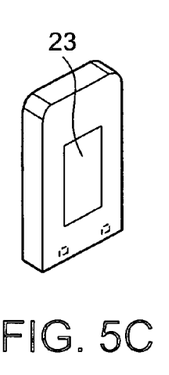
Figure 5D:
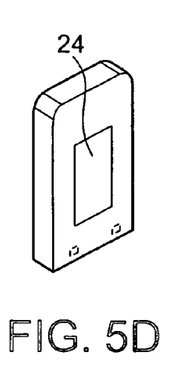
Figure 5E:
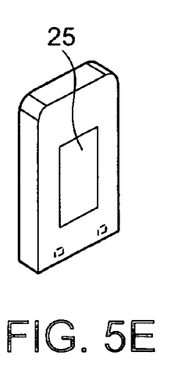

FIG. 4 shows another embodiment of the method for attaching the attachment 2 to the folding-type cellular phone 1. The attachment 2 is attached to the casing of the cellular phone 1 from a backside of the cellular phone 1, that is, along an arrow direction in FIG. 4.

FIGS. 5A to 5E show embodiments of the attachment, which include a camera 21, a speaker 22, a liquid crystal display unit 23, a touch panel 24, and a transparent portion (or opening portion) 25, respectively.

Figures 6A, 6B:
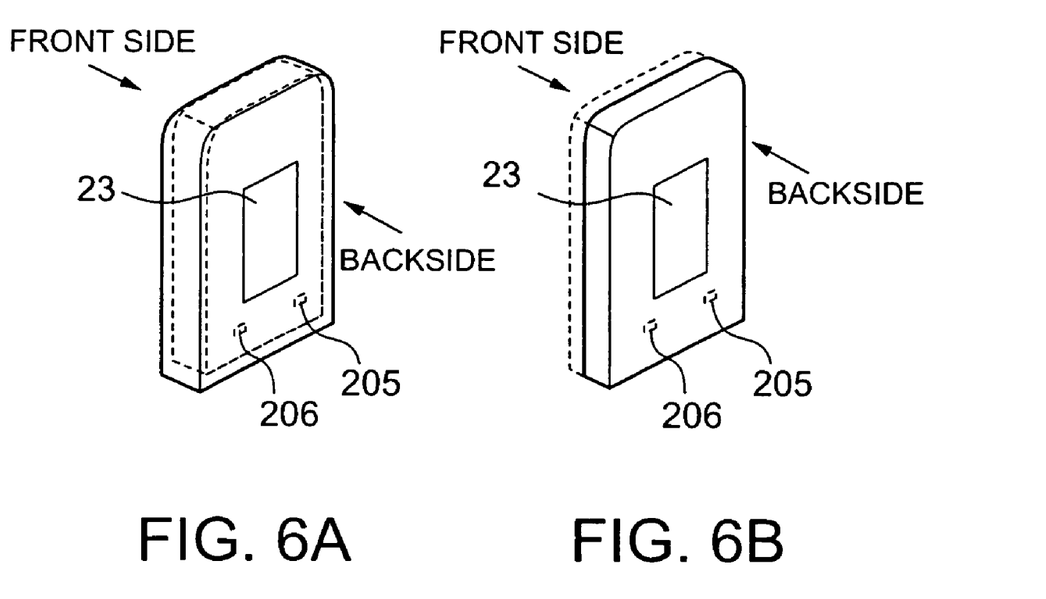
FIGS. 6A and 6B are perspective views of other embodiments of the attachment.
Figure 7A:
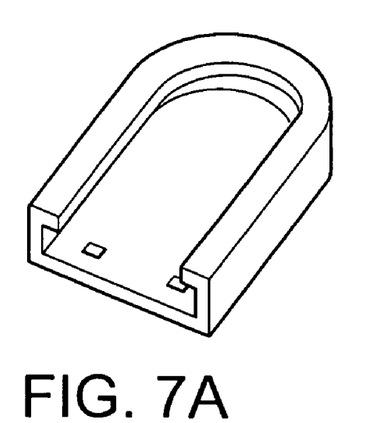
FIGS. 7A, 7B, 7C, 7D and 7E are perspective views of the embodiments of the attachment, viewed from another direction.
Figure 7B:
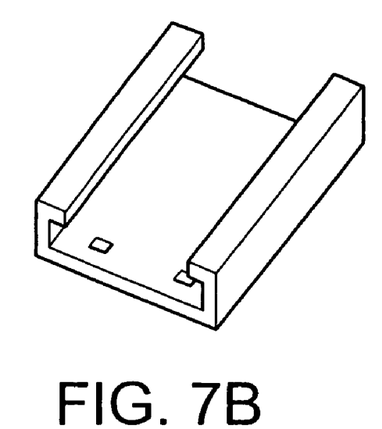
Figure 7C:
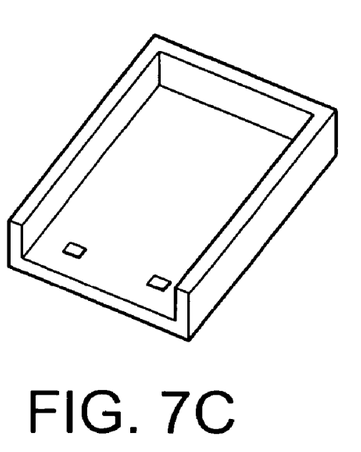
Figure 7D:
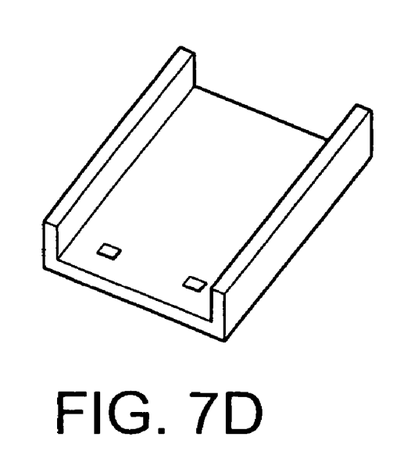
Figure 7E:
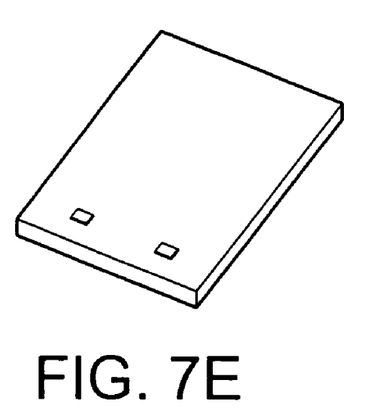

FIGS. 6A and 6B show embodiments of the attachment. FIG. 6A shows the attachment 2 for use in the attachment method shown in FIG. 4, the attachment 2 including a surface on which the liquid crystal display unit 23 is arranged, and two side surfaces sandwiching the casing of the cellular phone. FIG. 6B shows another embodiment of the attachment 2 including a surface on which the liquid crystal display unit 23 is arranged, and three side surfaces surrounding the casing of the cellular phone. These three side surfaces have a height shorter than a thickness of the casing of the cellular phone. However, the height of the three side surfaces may be equal to the thickness of the casing.

FIGS. 7A to 7E are perspective views of the embodiments of the attachment, which are shown in the above drawings and viewed from another direction. As methods for attaching these attachments, for example, there are: first, a method for inserting the casing of the cellular phone into the attachment (for example, FIGS. 7A and 7B); second, the method for engaging a groove portion or a protruding portion, which is formed on the attachment, to a protruding portion or a groove portion, which is formed on the casing of the cellular phone (for example, FIGS. 7C and 7D); third, a method for fastening the attachment to the casing by means of screws (for example, FIGS. 7C, 7D and 7E); and others.

Figure 8A:
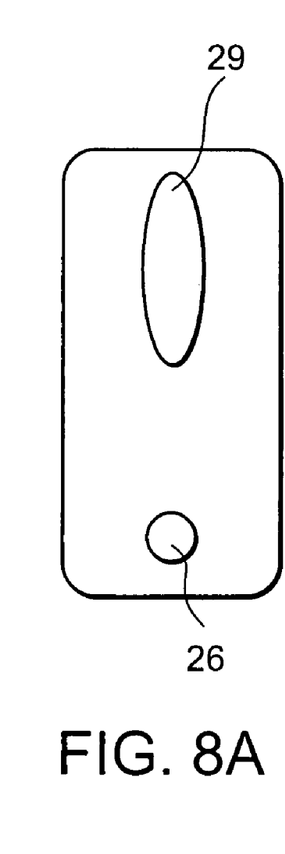
FIGS. 8A, 8B, 8C, 8D and 8E are front views showing other embodiments of the attachment.
Figure 8B:
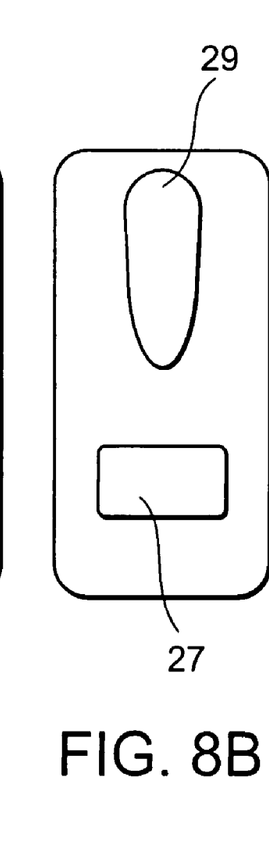
Figure 8C:
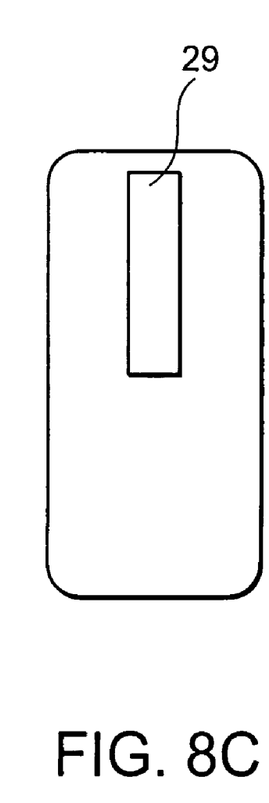
Figure 8D:
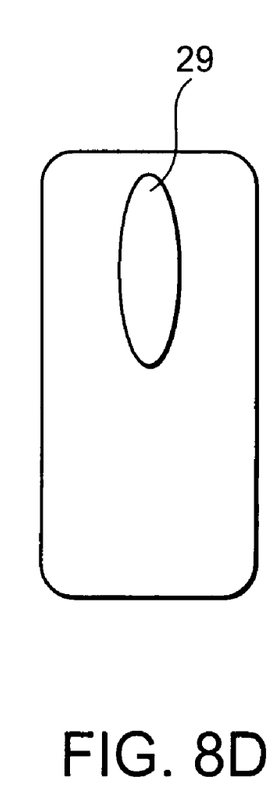
Figure 8E:
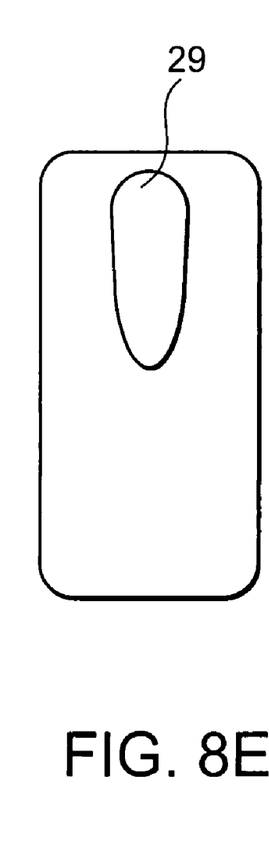
Figure 9:
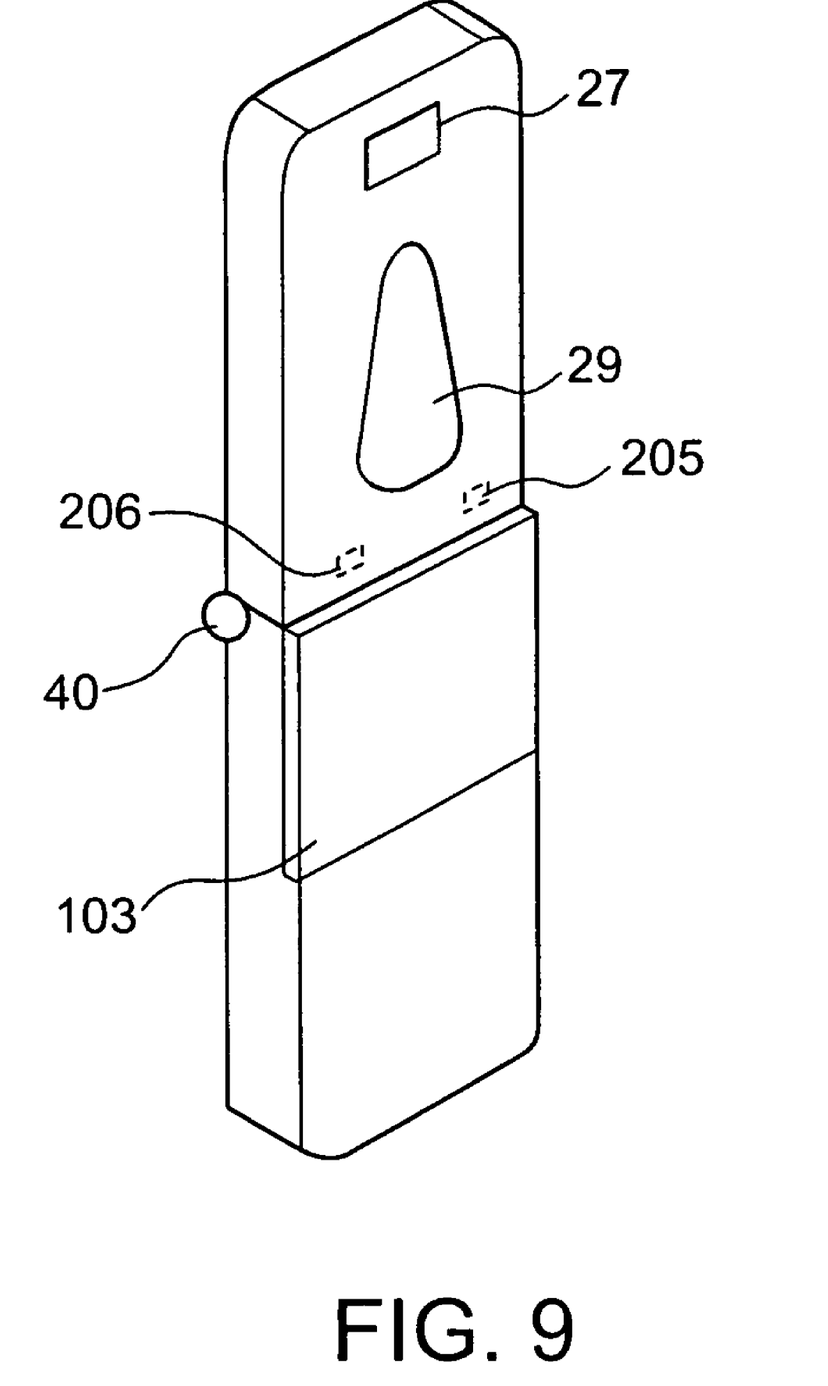
FIG. 9 is a perspective view showing an embodiment of a cellular phone to which the attachment shown in FIG. 8B is attached.

FIGS. 8A to 8E show embodiments of the attachment, which include transparent portions 29. FIG. 8A shows an embodiment of the attachment, which includes the transparent portions 29 and a camera 26, and FIG. 8B shows an embodiment of the attachment, which includes the transparent portion 29 and a speaker 27. Each of the attachments including the transparent portions 29 is applied to the cellular phone including the liquid crystal display unit on the backside thereof. The transparent portions 29 can be opening portions. Alternatively, a transparent plate can be arranged on each of the transparent portions 29. When the attachment is attached to the casing of the cellular phone, the transparent portion 29 can have a size sufficient to enable a user to view the whole of the liquid crystal display unit on the casing of the cellular phone. However, the size of the transparent portion 29 may be smaller than that of the liquid crystal display unit on the casing. In this case, the control unit of the cellular phone recognizes a position and shape of the transparent portion 29 of the attachment based on a signal received from the attachment, and controls the liquid crystal display unit on the casing in accordance with the shape of the transparent portion 29. When a touch panel is formed on a part or all of the liquid crystal display unit on the casing of the cellular phone, the transparent portion 29 is an opening. FIG. 9 is a perspective view of the cellular phone 1 to which the attachment 2 including the transparent portion 29 and the speaker 27 is attached.

Figure 10:
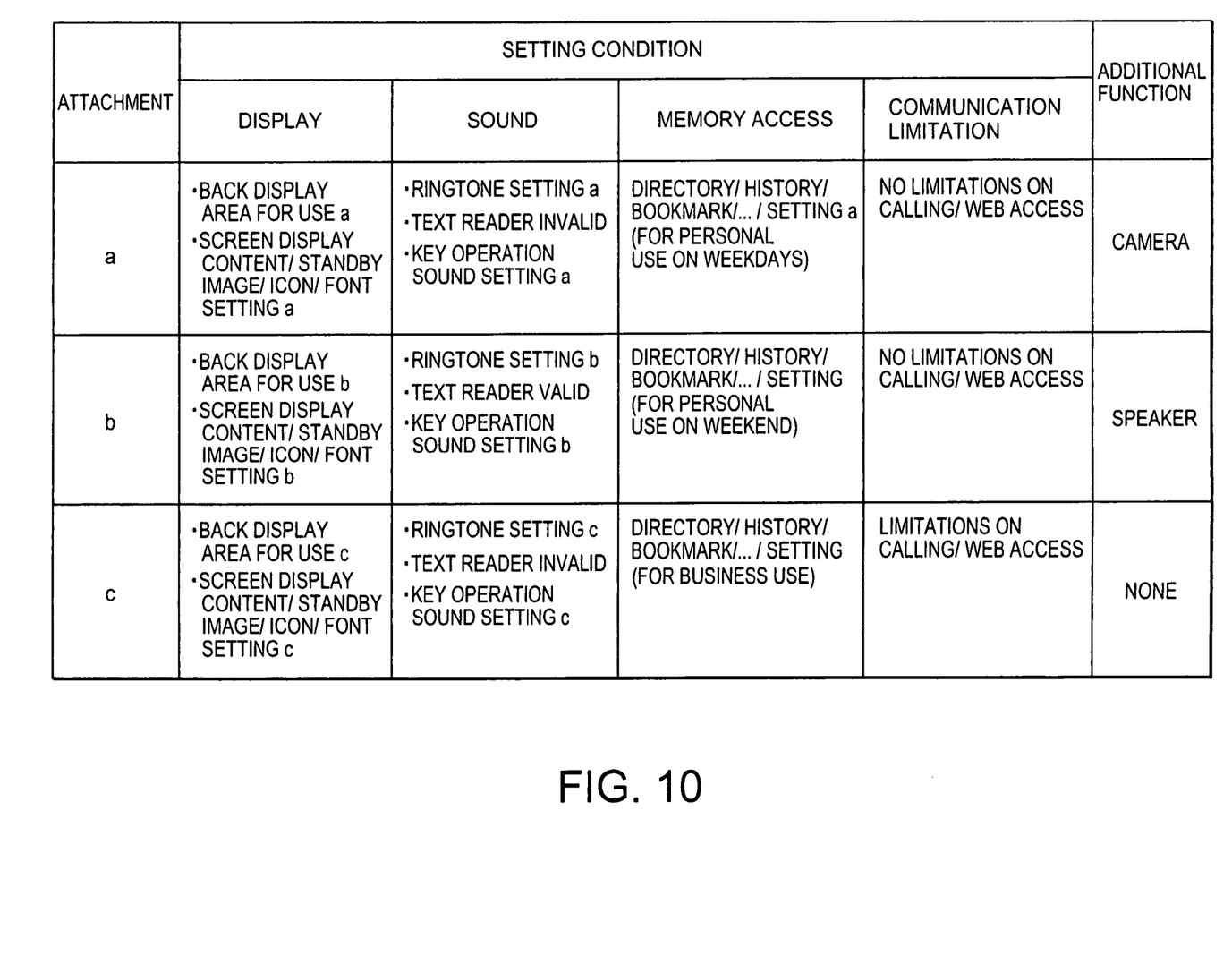
FIG. 10 is a table of embodiments of setting conditions and new functions for the cellular phone, which are set by the attachment.

FIG. 10 shows embodiments of setting conditions for the cellular phone, which are set in response to attachments, and functions added thereto in response. to the attachments, when the attachments are attached to the cellular phone. As items of the setting conditions, for example, there are a display, a sound, a memory access, and a communication control. With regard to the display, for example, it is possible to set a control area of a backside display unit, a display content on a screen, a standby screen, icons, fonts and the like. With regard to the sound, it is possible to set a ringtone, a text reader, a key operation sound and the like. With regard to the memory access, it is possible to set a phone directory, a history, a bookmark and the like. The communication control relates to limitations on functions regarding the Internet, which are, for example, a connection prohibition to the Internet, a connection only to a permitted web site, a download prohibition of a content, a mail blocking (automatic deletion), a transmission prohibition of mail and the like. Furthermore, it is possible to set whether or not use of an agent function is enabled. In this agent function, a web server can be automatically accessed at a fixed interval, and latest data can always be read out therefrom as if an always-on connection were made therewith. Accordingly, it is made possible to check weather information and stock price information, to manage a schedule, and so on. For example, when the attachment including the display unit is attached to the cellular phone, the cellular phone automatically accesses a predetermined server, and always displays a latest schedule for a group member on the display unit. Moreover, as additional functions, there are functions of a camera, light emission, a speaker, display, a touch panel, fingerprint authentication and the like. When the attachment includes the function unit, the function thereof is added to the cellular phone. For example, when an attachment (a) is attached to the cellular phone, the function of the camera is attached thereto, and simultaneously, many predetermined setting conditions are set. For example, the memory access is changed to a setting for personal use, which is preset by a user, and the communication limitations are set to be "none." In a similar way, also for an attachment (b), the setting conditions can be changed and the functions can be added. To an attachment (c), the functions are not added but, for example, the memory access is changed to a setting for a business use, and the communication limitations are set to be "present."

When the attachment is detached from the cellular phone, the cellular phone can automatically return to original setting conditions before the attachment is attached thereto. When the attachment is attached to the cellular phone, a user can manually change the setting conditions for the cellular phone, and make the attachment store the changed conditions. In this case, the attachment includes a predetermined memory unit. The control unit can control only to add the functions in accordance with the signal transmitted from the attachment.

Figure 11:
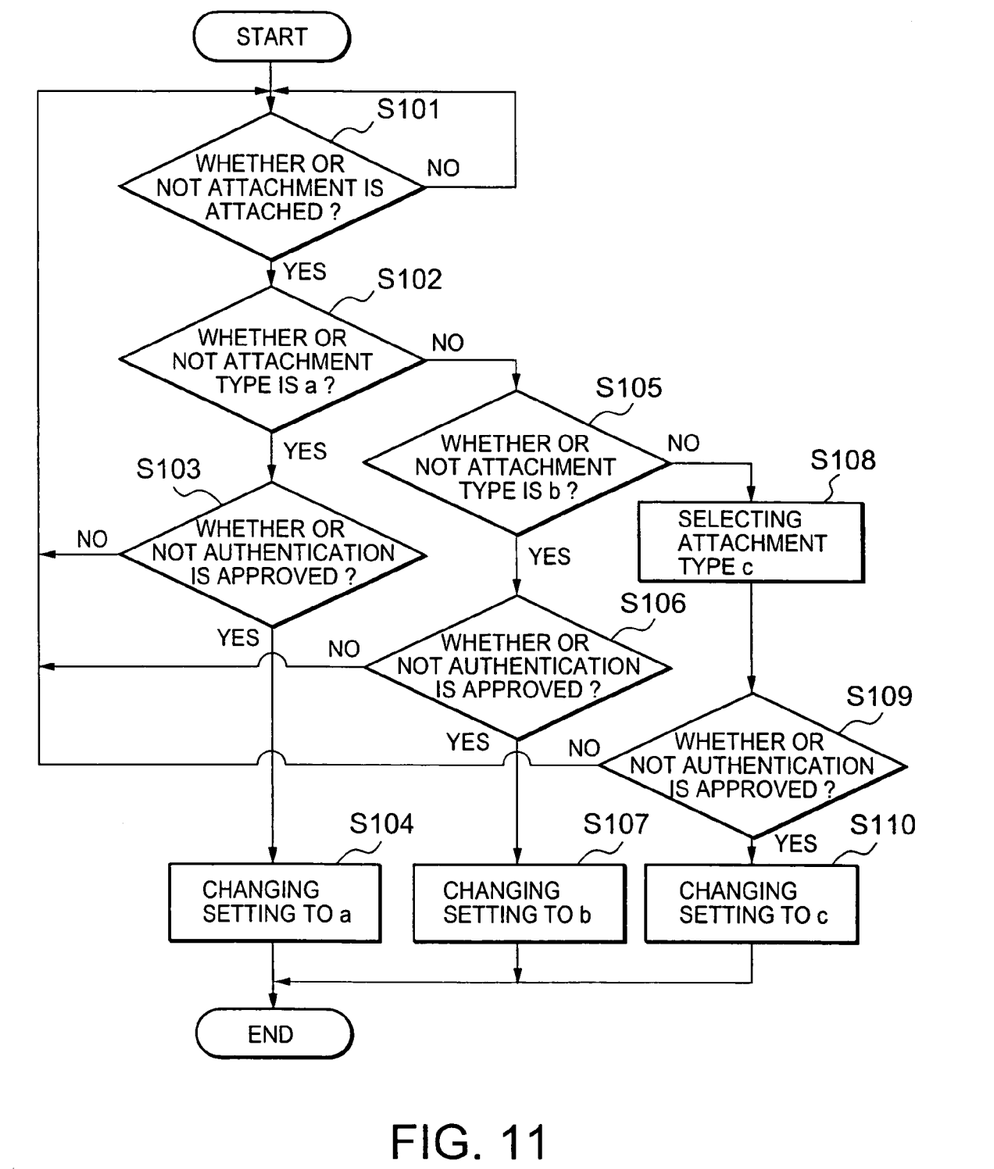
FIG. 11 is a flowchart showing control of a control unit of the cellular phone.

FIG. 11 shows an embodiment of a flow of changing the setting conditions for the cellular phone to which the attachment is attached. The cellular phone 1 verifies whether or not the signal transmitted from the attachment is present, and determines whether or not the attachment is attached thereto (S101). Furthermore, the cellular phone 1 determines a type of the attachment based on a content of the signal (S102, S105 and S108) Next, the cellular phone 1 verifies whether or not authentication of a user is present (S103, S106 and S109). In this case, when the user approves the attached attachment, the user performs the authentication by means of an entry of a secret identification code, recognition of the fingerprint or others. By such an entry as described above, the cellular phone can add the functions in response to the respective attachments, and can change the setting conditions (S104, S107 and S110). When the authentication of the user is not performed, the cellular phone does not perform the addition of the functions and the change for the setting conditions. The user is requested to detach the attachment attached at present or to change the attachment to another one.

Figure 12:
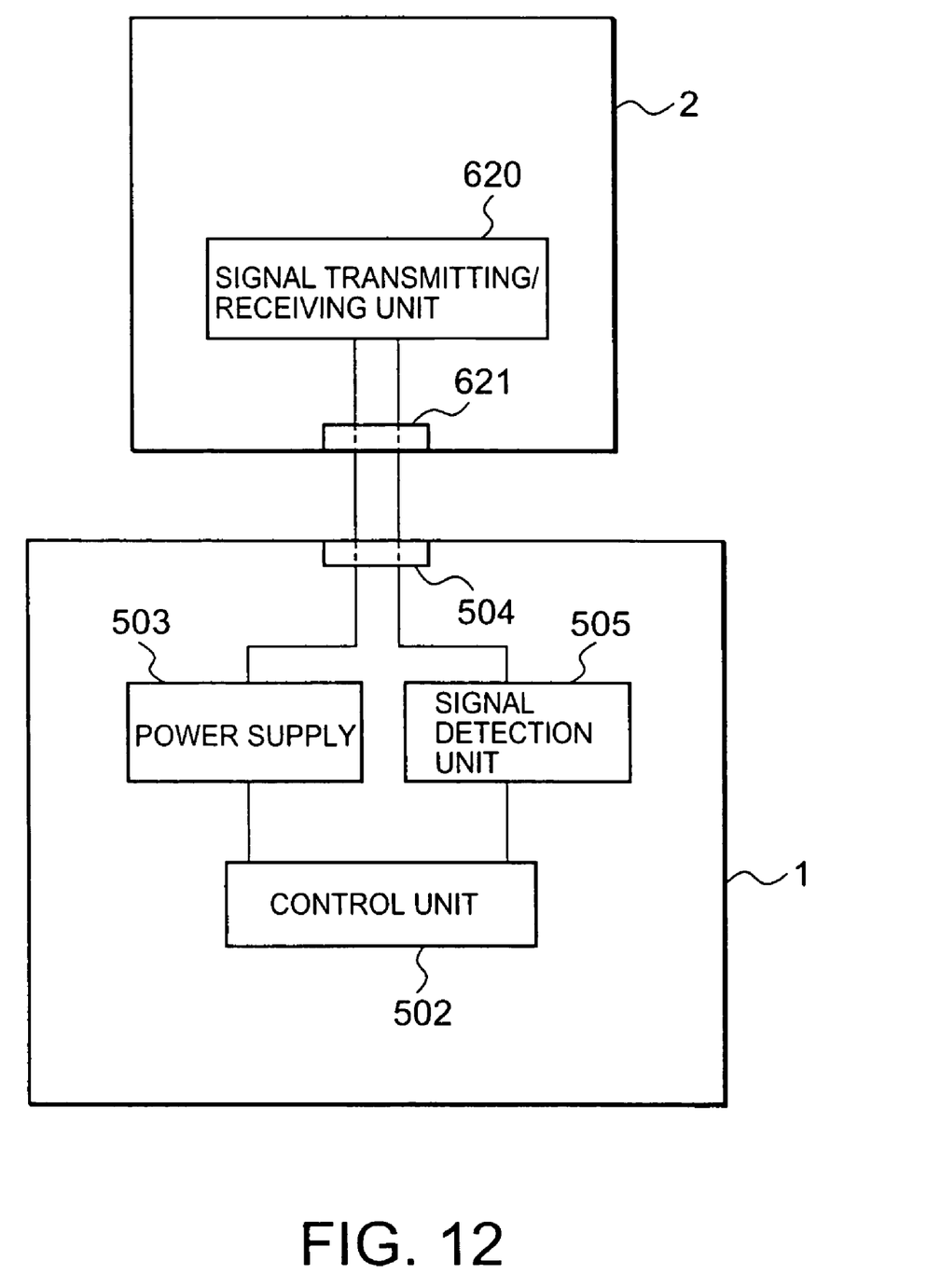
FIG. 12 is a block diagram of a cellular phone to which an attachment without a function unit is attached.

FIG. 12 shows a block diagram of an embodiment of a cellular phone to which another type of attachment 2 is attached. The cellular phone 1 includes a signal detection unit 501, a control unit 502, a power supply 503, and a terminal 504. The signal detection unit 501 receives, through the terminal 504, a signal intrinsic to the attachment 2 and outputted by a signal transmitting/receiving unit 620 of the attachment 2, detects that the attachment 2 has been attached to the cellular phone 1, identifies a type of the attachment 2, and outputs an identification result to the control unit 502. The control unit 502 controls the power supply 503, and supplies required power to the attachment 2 through the terminal 505. This attachment 2 does not include the additional function unit, and the control unit 502 receives the signal from the attachment 2, and sets setting conditions corresponding to the signal in the cellular phone 1.

Figure 13A:
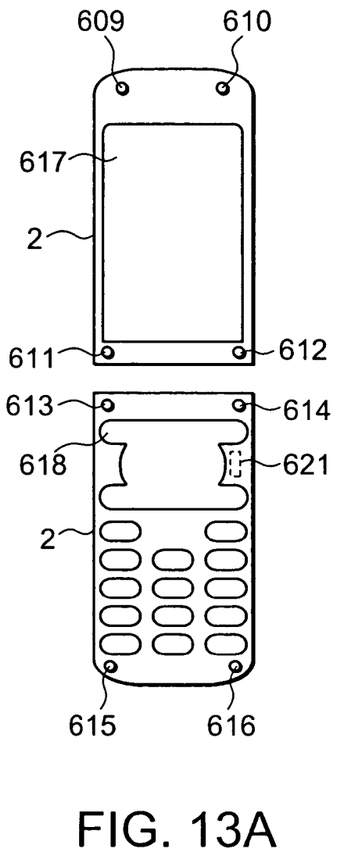
FIGS. 13A, 13B and 13C are front and side views of attachments, and a front view of a cellular phone in which the attachments are attached to a display unit arrangement surface and an operation unit arrangement surface, respectively.
Figure 13B:
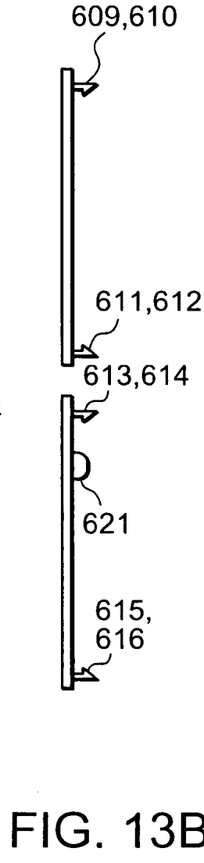
Figure 13C:
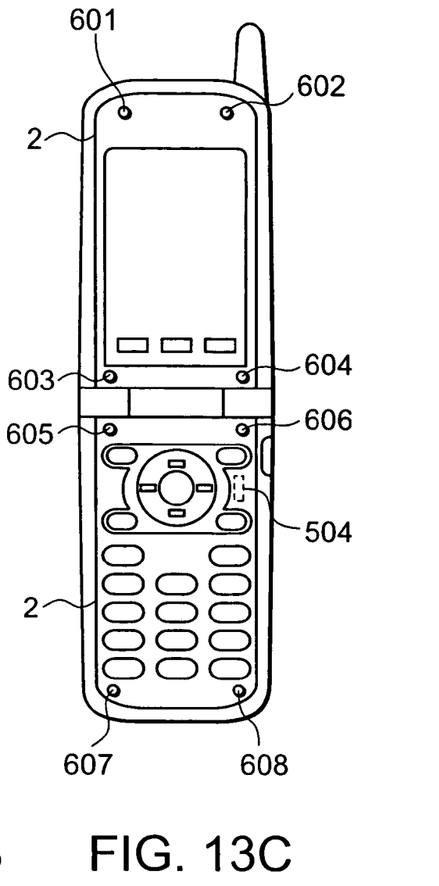

FIGS. 13A and 13B are plan view and side view of the embodiment of the attachment 2 which is attached to a front surface portion of the folding-type cellular phone 1 and is shown in FIG. 12. As the attachment 2, possible ones are one to be attached to a casing including a display unit, and one to be attached to an operation unit. The attachment 2 includes opening portions 617, 618 and 619, and protruding portions 609 to 616. In this drawing, the attachment 2 attached to the operation unit includes a coupling terminal 621. However, the attachment 2 attached to the display unit can include the coupling terminal 621. If one of the two attachments 2 includes the coupling terminal 621, it is possible to attach the one attachment 2 to the cellular phone 1. The front surface portion of the cellular phone 1 includes recess portions 601 to 608, and a coupling portion 504. FIG. 13C shows the front surface portion of the cellular phone 1 attaching the attachment 2 thereto. The protruding portions 609 to 616 of the attachment 2 are engaged into the recess portions 601 to 608 of the cellular phone 1, the coupling terminal 621 is engaged into the coupling portion 504, and thus the attachment 2 is attached to the cellular phone 1. The casing including the display unit can include the coupling unit 504. When the cellular phone 1 is of a type other than the folding type, one piece of the attachment 2 can be used.

Figure 14:
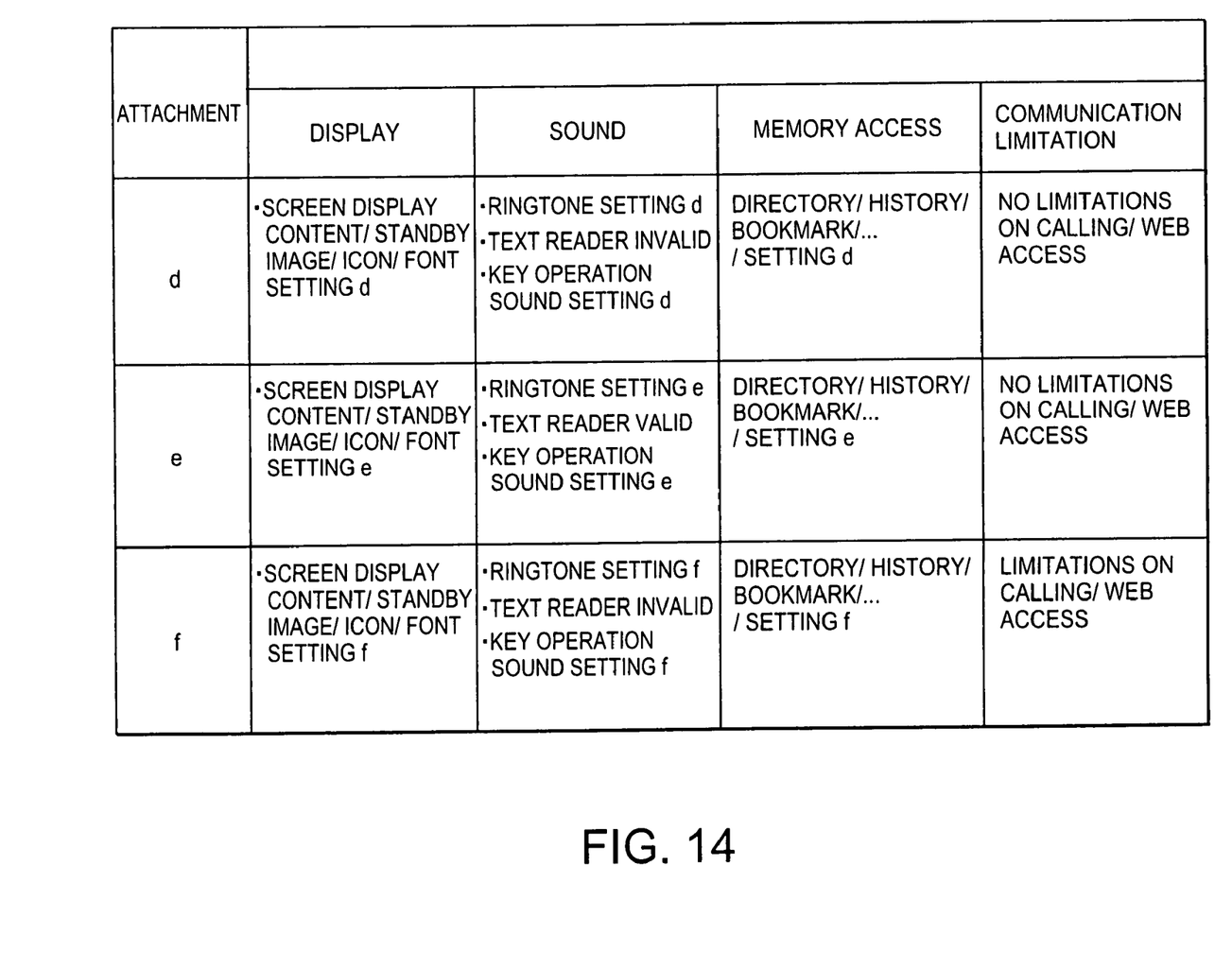
FIG. 14 is a table of embodiments of setting conditions for the cellular phone, which are set by the attachment without the function unit.

FIG. 14 shows an example of setting conditions set for the cellular phone 1 when the above-described attachments denoted here by reference symbols (d), (e) and (f) are attached thereto. Basically, the same items as those of the setting conditions shown in FIG. 10 are set as predetermined conditions.

When the attachment is attached to the cellular phone, the cellular phone can include the new functions, and can easily change the current setting conditions to the predetermined conditions.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A cellular phone comprising:
    a first casing that includes a display unit provided on one surface thereof;
    a second casing that is pivotable with respect to the first casing, the second casing including a plurality of key pads;

a pivot that enables the first and second casings to be placed in a closed position and in a plurality of open positions to thereby provide for a folding type cellular phone; and a plurality of attachments each having a substantially similar shape as the first casing and each of which configured to fit over the first casing to thereby envelop the first casing, wherein an operational state of the cellular phone is automatically set to one of a plurality of possible operational states, based on which of said plurality of attachments is fitted over the first casing.

2. The cellular phone according to claim 1, wherein each of the attachments includes an opening on one surface thereof, for allowing the display unit of the first casing to be viewed from an exterior position when the attachment is fitted over the first casing, and wherein the respective opening of each of the attachments has a same size as the display unit.

3. The cellular phone according to claim 1, wherein an entirety of the first casing is fitted over by any one of the attachments.

4. The cellular phone according to claim 1, further comprising a control unit, wherein a part of the display unit includes a function of a touch panel, and wherein the control unit controls the touch panel.

5. The cellular phone according to claim 4, wherein the control unit recognizes attachment of any one of the attachments and a type thereof, and executes a control operation after confirming a predetermined entry.

6. The cellular phone according to claim 4, wherein, when said any one of the attachments is detached, the control unit returns the setting conditions for the cellular phone to original ones.

7. The cellular phone according to claim 1, wherein a front surface and a back surface of the first casing includes at least one of a recess portion and a protruding portion for attaching the attachment securely to the first casing when any one of the attachments is fitted over the first casing.

8. The cellular phone according to claim 1, wherein a display characteristic of the display unit on the first casing is changed to one of a plurality of possible display characteristics, based on which of the plurality of attachments is attached to the cellular phone.

9. The cellular phone according to claim 1, wherein a sound outputted by the cellular phone is set to one of a plurality of different sounds, based on which of the plurality of attachments is attached to the cellular phone, and wherein the sound to be outputted is at least one of: a) sounds to be output when one of the plurality of keypads are actuated, and b) ringtone sounds indicating an incoming call to the cellular phone.

10. An attachment attached to a cellular phone that includes a first casing and a second casing and a pivot mechanism provided between the first and second casings to allow the first and second casings to pivot with respect to each other, the attachment comprising:

a housing shaped the same as the first casing of the cellular phone, wherein the housing includes:

a first exterior surface having an opening provided thereon for enabling a display unit located on the first casing of the cellular phone to be viewed when the attachment is attached to the cellular phone; and a second exterior surface positioned opposite to the first exterior surface;

a function unit which performs a predetermined function; and a control unit that controls the function unit and which automatically changes an operational state of the cellular phone when the attachment is fitted over the first casing of the cellular phone, wherein an opening is provided between the first and second exterior surfaces of the attachment to thereby allow the attachment to be fitted over the first casing of the cellular phone.

11. The attachment according to claim 10, wherein the function unit is at least one of a camera, a speaker, a display unit, and a touch panel.

12. The attachment according to claim 10, wherein the opening of the attachment has a predetermined shape that is a same as a shape of the display unit provided on the first casing.

13. The attachment according to claim 10, wherein the attachment is arranged on a backside of the cellular phone.

14. The attachment according to claim 13, further comprising a transparent portion of a predetermined shape.

15. The attachment according to claim 14, wherein the transparent portion is an opening portion.

16. The attachment according to claim 14, wherein a transparent plate is formed in the transparent portion.

17. The attachment according to claim 14, wherein the transparent portion is located at a position corresponding to the display unit on a back of the cellular phone.

18. The attachment according to claim 17, wherein the transparent portion corresponds to a part of the display unit.

19. The attachment according to claim 10, further comprising grooves provided on an interior surface of the attachment, wherein the attachment is engaged onto the cellular phone by coupling of the grooves of the attachment to recesses provided on an exterior surface of the first casing of the cellular phone.

20. The attachment according to claim 10, wherein the attachment is fastened to the cellular phone by means of a screw.

21. The attachment according to claim 10, further comprising recesses provided on an interior surface of the attachment, wherein the attachment is attached to the cellular phone by coupling of the recesses of the attachment to grooves provided on an exterior surface of the first casing of the cellular phone.

22. The attachment according to claim 10, further comprising a terminal which receives a supply of electric power from the cellular phone.

23. The attachment according to claim 10, wherein the cellular phone is of a folding type.

24. The attachment according to claim 10, wherein the second casing of the cellular phone includes a plurality of keypads provided thereon, and wherein the display unit provided on the first casing of the cellular phone is a touch screen.

25. The cellular phone according to claim 10, wherein the opening provided between the first and second exterior surfaces of each of the attachments has a width that is slightly greater than a width of the first casing of the cellular phone, and wherein the opening has a length that is slightly greater than a length of the first casing of the cellular phone.

26. A cellular phone to which one of a plurality of detachable attachments is attached,
   wherein each of the attachments has a case-like shape with a first exterior surface, a second exterior surface opposite the first exterior surface, first and second sidewalls, and an opening provided within the case-like shape, and
   the cellular phone comprises:
   a first casing having a substantially same width and height as the attachment;
   a second casing pivotably attached to the first casing,
   wherein the one of the attachments is fitted over the first casing to thereby attach the one of the attachments to the cellular phone, and
   wherein an operational state of cellular phone is automatically set to one of a plurality of possible operational states, based on which of the plurality of attachments is fitted over the first casing.

27. The cellular phone according to claim 26, further comprising a control unit,
   wherein each of the attachments includes a function unit which performs a predetermined function, and
   the control unit controls at least one of a change for a setting conditions and an addition of functions of the cellular phone.

28. The cellular phone according to claim 26,
   wherein the first casing of the cellular phone includes a display unit of a predetermined shape, and
   wherein each of the attachments includes an opening provided on the first external surface thereof, the opening having the predetermined shape to enable the display unit to be viewed externally when any one of the attachments is fitted onto the first casing.

29. The cellular phone according to claim 26, wherein the second exterior surface extends in a direction orthogonal to the first and second sidewalls with a gap provided for a portion of the second exterior surface.

* * * * *